US009712603B2

(12) United States Patent
Loader et al.

(10) Patent No.: US 9,712,603 B2
(45) Date of Patent: Jul. 18, 2017

(54) REMOTE CONTROL OF A SHARED APPLICATION (71) Applicant: MICROSOFT CORPORATION, Redmond, WA (US)

(72) Inventors: Marguerite R. Loader, Shoreline, WA (US); Brook J. Durant, Bellevue, WA (US); Douglas W. Herman, Issaquah, WA (US); Philip A. Rogan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 14/090,898

(22) Filed: Nov. 26, 2013

(65) Prior Publication Data
US 2015/0149529 A1 May 28, 2015

(51) Int. Cl.
*G06F 15/16* (2006.01)
*H04L 29/08* (2006.01)
*G06F 9/54* (2006.01)
*G06F 12/00* (2006.01)

(52) U.S. Cl.
CPC .............. *H04L 67/10* (2013.01); *G06F 9/542* (2013.01); *H04L 29/08072* (2013.01); *H04L 67/08* (2013.01); *G06F 2209/544* (2013.01); *G06F 2209/546* (2013.01)

(58) Field of Classification Search
CPC ........... H04L 29/06401; H04L 65/4015; H04L 67/025; H04L 67/08; H04L 67/10; G06F 2209/544; G06F 2209/546; G06F 9/542
See application file for complete search history.

(56) References Cited

U.S. PATENT DOCUMENTS

| 7,949,633 | B1 | 5/2011 | Shaver et al. |
| 8,201,094 | B2 | 6/2012 | Wang et al. |
| 8,281,248 | B2 | 10/2012 | Kurpick et al. |
| 8,739,044 | B1* | 5/2014 | Varadarajan .......... G06F 3/0481 709/204 |
| 2002/0138624 | A1* | 9/2002 | Esenther ................ H04L 29/06 709/227 |

(Continued)

FOREIGN PATENT DOCUMENTS

EP   2077496 A1   8/2009

OTHER PUBLICATIONS

Tso, et al., "Multiuser Collaboration with Networked Mobile Devices", In 25th Digital Avionics Systems Conference, Oct. 15, 2006, 12 pages.

(Continued)

*Primary Examiner* — Zarni Maung
(74) *Attorney, Agent, or Firm* — Shook, Hardy & Bacon L.L.P.

(57) ABSTRACT

Systems, methods, and computer-readable storage media are provided for enabling client devices to remotely control a shared application. A remote control service receives a request for a shared application to be controlled by a multiple client devices. Based on this request, the client devices are enabled to remotely control the shared application. A command from one of the client devices is received at the remote control service to modify a display of the shared application without the client device receiving any sensitive information associated with the shared application or the computing device running the shared application. The command is used to cause a modification to the display of the shared application.

20 Claims, 5 Drawing Sheets

(56) References Cited

U.S. PATENT DOCUMENTS

| | | | |
|---|---|---|---|
| 2005/0097159 A1* | 5/2005 | Skidgel | G06F 17/30873 709/200 |
| 2007/0255788 A1 | 11/2007 | Troung | |
| 2008/0320150 A1* | 12/2008 | Boehringer | G06F 17/30873 709/228 |
| 2010/0082746 A1* | 4/2010 | Ulrich | G06F 17/30873 709/204 |
| 2010/0228989 A1* | 9/2010 | Neystadt | G06F 21/10 713/185 |
| 2011/0197263 A1 | 8/2011 | Stinson, III | |
| 2011/0289156 A1* | 11/2011 | Pirnazar | G06F 17/30873 709/206 |
| 2012/0209954 A1* | 8/2012 | Wright | H04L 43/0817 709/217 |
| 2013/0218978 A1 | 8/2013 | Weinstein et al. | |

OTHER PUBLICATIONS

Wang, et al., "Google Wave Operational Transformation", Published on: Jul. 2010, Available at: http://wave-protocol.googlecode.com/hg/whitepapers/operational-transform/operational-transform.html.

"Simultaneously Edit a Document with other Authors", Retrieved on: Sep. 17, 2013, Available at: http://office.microsoft.com/en-001/mac-word-help/simultaneously-edit-a-document-with-other-authors-HA102928661.aspx.

Abe, et al., "Tolerant Sharing of a Single-user Application among Multiple Users in Collaborative Work", In Proceedings of the ACM Conference on Computer Supported Cooperative Work, Feb. 6, 2010, 2 pages.

* cited by examiner

REMOTE CONTROL OF A SHARED APPLICATION

BACKGROUND

Typically, when a first device is able to control some aspect of a second device, the first device needs to have information about the second device that enables communication between the two devices, including an Internet protocol address and other potentially sensitive information. Additionally, only one device has traditionally been able to control another device at one time. As such, even if there are multiple devices that are capable of controlling the second device, only one device may request to control some aspect of the second device, and after receiving permission, may proceed to control the second device. This method, however, does not provide for a smooth and seamless transition of control from one device to another.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for enabling multiple client devices to participate in the control of a shared application, such as a document, software, gaming application, video, etc. The multiple client devices are able to share in a group control of the shared application running on a computing device without receiving any sensitive or otherwise secured information associated with the shared application, the computing device, or even a network associated with the computing device. The shared application, after requesting that client devices be allowed to participate in the control of a shared application, may receive one or more assigned attributes, such as a non-human readable identifier, a human-readable identifier, and a numeric identifier (e.g., PIN number). These identifiers allow for the client devices to control the shared application without having any sensitive information associated with the shared application. A remote control service is used to ensure that sensitive information is not transmitted between the client devices and the computing device running the shared application, and also enables multiple client devices to participate in the control of the shared application at the same time without the client devices needing to request permission each time a modification to the display of the shared application is to be made.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for enabling client devices to participate in control of a shared application. For instance, the client devices may be located remotely from the computing device running the shared application, or may be located in the same room as the computing device running the shared application. In one embodiment, at least one client device is located remotely and at least one client device is located in the same room as the computing device running the shared application. The shared application may be any application or document that is interactive or controllable, such as a slide presentation, a word processing document, a gaming application, enterprise software, other software, music, video, other multimedia, etc. The client devices are able to control the shared application by modifying the display of the shared application, such as going forward, backward, up, or down in the shared application, or going to the first part (e.g., slide of the application). For instance, if the shared application is a slide presentation, the client device is able to move to the previous slide, move to the next slide, move to the first slide in the presentation, etc. As such, a client device is able to modify what is currently being presented in the shared application.

In some embodiments, client devices are able to modify the shared application other than making content changes to the application, such as editing, modifying, deleting, adding, etc., to the content. In other embodiments, however, a client device is able to modify the shared application by modifying content. In any of the described embodiments, however, the client device is not provided with any sensitive or secure information regarding the shared application, the computing device running the shared application, or the network associated with the computing device. For instance, the IP address of the computing device is not communicated to a client device that is participating in the control of the shared application. Instead, a remote control service is utilized to receive a request for client devices to participate in the control of a shared application, to receive commands from client devices, and to cause modifications to the display or presentation of a shared application based on the commands. The remote control service knows how to route commands to shared applications, instead of the client devices having potentially sensitive information needed to communicate directly with the computing device that is running the shared application.

Accordingly, one embodiment of the present invention is directed to a method being performed by one or more computing devices having at least one processor, the method for enabling one or more client devices to remotely control a shared application. The method includes receiving a request to allow the one or more client devices to participate in remotely controlling the shared application, and based on the request, enabling the one or more client devices to remotely control the shared application. Further, the method includes receiving a command from one of the one or more client devices to modify a display of the shared application without the one of the one or more client devices having received sensitive information associated with the shared application or a computing device running the shared application. The method additionally includes utilizing the command to cause a modification to the display of the shared application.

In another embodiment, one or more computer storage media storing computer-useable instructions are provided that, when used by one or more computing devices, cause the one or more computing devices to perform a method for enabling one or more client devices to remotely control a shared application. The method includes receiving a request from the shared application to allow the one or more client devices to remotely control the shared application, at least a portion of the one or more client devices located remotely from a computing device running the shared application and the one or more client devices viewing a presentation of the shared application using a screen-sharing application, and assigning one or more attributes to remotely controlled session associated with the shared application. The method further includes communicating the one or more attributes to the shared application, the one or more attributes enabling the one or more client devices to access a control application having controls corresponding to the shared application, and receiving a command from one of the one or more client devices. The command enables the one of the one or more client devices to modify a display of the shared application without the one of the one or more client devices having sensitive information associated with the shared application or a computing device running the shared application. The method also includes communicating the command from the one of the one or more client devices to the shared application.

In yet another embodiment, a system is provided for enabling one or more client devices to remotely control a shared application. The system includes a remote control service comprising a request-receiving component that receives a request from the shared application to allow the one or more client devices to participate in a remote control of the shared application, and an attribute assignment component that assigns one or more attributes to a remotely controlled session associated with the shared application and that communicates the one or more attributes to the shared application. The one or more attributes enable the one or more client devices to access a control application having controls corresponding to the shared application. Further, the remote control service includes a command-receiving component that receives commands from the one or more client devices, the commands enabling the one or more client devices to modify a display of the shared application without the one or more client devices having sensitive information associated with the shared application or a computing device running the shared application. The remote control service includes a command-routing component that communicates the commands from the one or more client devices to the shared application, thus causing a modification of the display of the shared application.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

Figure 1:
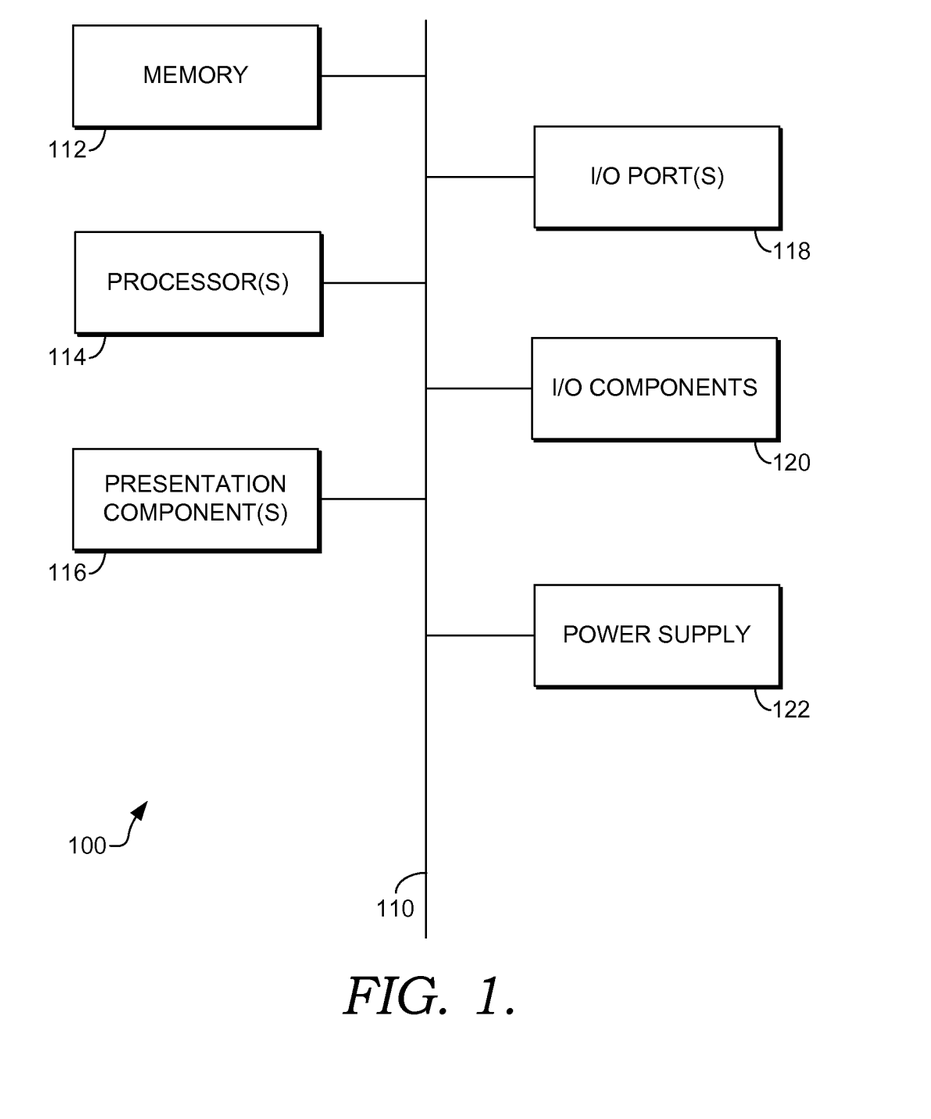
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like. An NUI processes air gestures, voice, or other physiological inputs generated by a user. These inputs may be interpreted as search requests, words, or symbols appearing in apps available for retrieval in response to input search requests and the like presented by the computing device 100. These requests may be transmitted to the appropriate network element for further processing.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Figure 2:
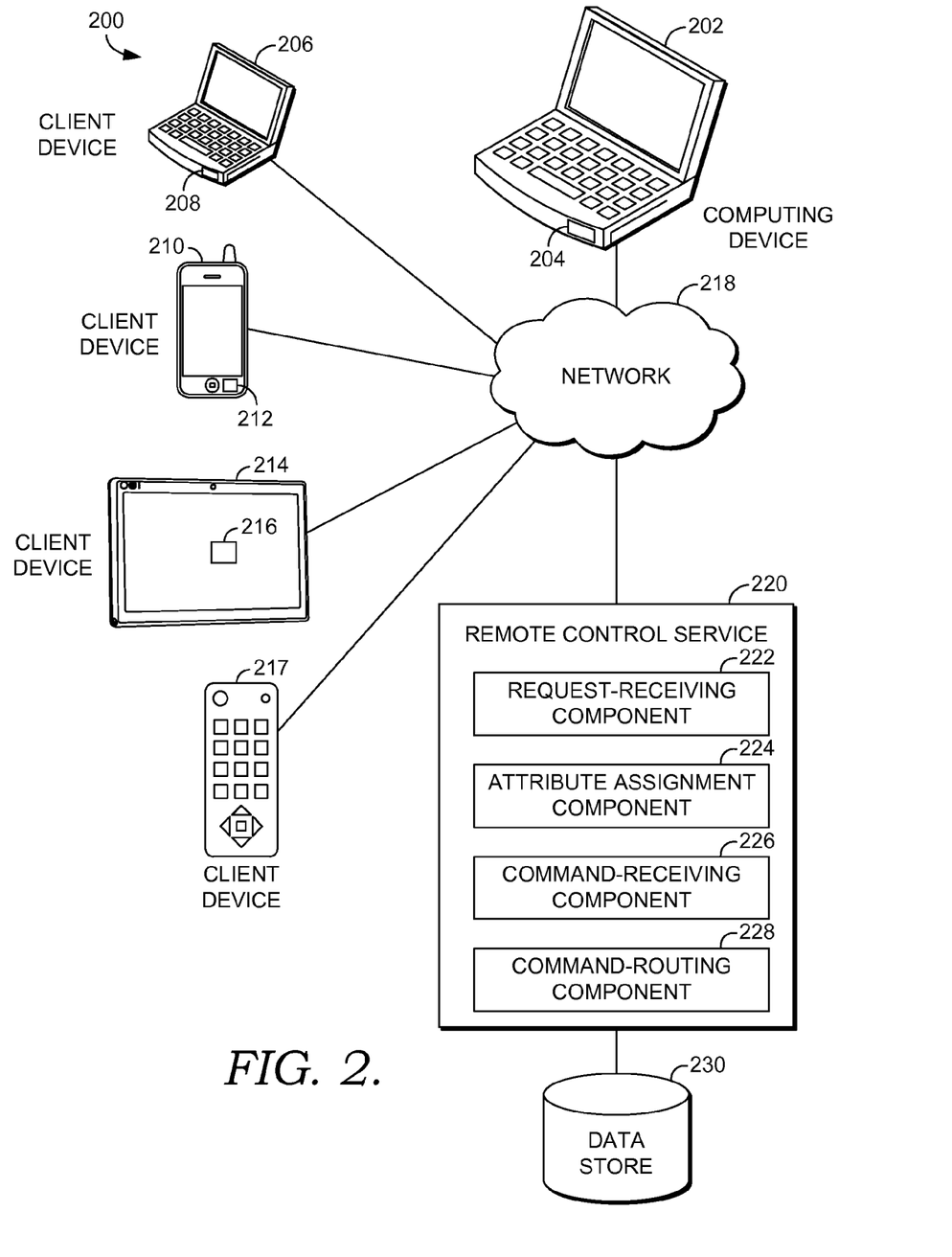
FIG. 2 is a block diagram of an exemplary system architecture in which embodiments of the invention may be employed.

As previously set forth, embodiments of the present invention provide systems, methods, and computer-readable storage media for enabling one or more client devices to remotely control a shared application. With reference to FIG. 2, a block diagram is provided illustrating an exemplary system 200 in which embodiments of the present invention may be employed. Generally, the system 200 illustrates an environment in which one or more client devices may participate in the control of a shared application using a remote control service. In some embodiments, at least a portion of the client devices is located remotely from the computing device running the shared application. In this case, the shared application may be viewed by the remote client device by way of a screen-sharing application. Among other components not shown, the computing system 200 generally includes a computing device 202 that is running the shared application 204, three client devices (shown as items 206, 210, 214, and 217) that are participating in the remote control of the shared application 204, and a remote control service 220, all of which communicate with one another by way of a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of client devices may be employed in the system 200 within the scope of embodiments of the present invention. For instance, a particular presentation may be given to a group of 1000 individuals, 500 individuals, 100 individuals, 50 individuals, or a much smaller group, such as five individuals. The quantity of client devices is not dictating as to the operation of embodiments of the present invention. Any number of participating client devices may be employed to control the shared presentation. Each client device (items 206, 210, 214, and 217) may comprise a single device/interface or multiple devices/interfaces cooperating in a distributed environment. In one embodiment, each client device (items 206, 210, 214, and 217) includes a display device that allows the participants of the client devices (items 206, 210, 214, and 217) to not only view the shared presentation, but also to input commands for controlling the shared presentation. In another embodiment, the client device may not have a display associated with it, but instead may be more like a controller that just allows the user to input commands by way of one or more buttons, for example. This type of controller may be used when polling an audience, or when a view of the shared application from a remote location is unnecessary. In yet another embodiment, the client device may be like the controller described above, but may be a controller that is typically used in relation to a gaming application. The controller may not have a display associated therewith, but may have multiple input mechanisms (e.g., up button, down button, left button, right button, reset button, home button) that allow the user to control the shared application, such as a gaming application.

As such, in one embodiment, client devices (items 206, 210, 214, and 217) may be the type of computing device described above with respect to FIG. 1. A particular type of computing device is not required. As mentioned, distinction is not made between such categories as "workstation," "server," "laptop," "hand-held device," etc., as all are contemplated within the scope of FIG. 1, and reference to "computing device," and as such, all are contemplated to be within the scope of the present invention. But in other embodiments, the client device may not have a display associated therewith, but instead may be more of a simple controller that allows for user input to control the shared application. For example, a first client device may be a mobile device, a second client device may be a tablet, while a third client device may be a laptop. Each of these is provided with a display capable of displaying a shared application, and each of these is provided with some type of input mechanism allowing the user to input commands, such as a keyboard, mouse, voice command component, etc. As such, any computing device described herein may be used as a client device. Additionally, other components or modules not shown also may be included within the computing system 200.

In some embodiments, one or more of the illustrated components/modules may be implemented as stand-alone applications. In other embodiments, one or more of the illustrated components/modules may be implemented via the computing device 202 running the shared application 204, the client devices (items 206, 210, 214, and 217), the remote control service 220, or as an Internet-based service. For instance, the computing device 202 has the capability of running a shared application, and also has the capability of utilizing a screen-sharing application that allows remote participants to view the shared presentation, even if these participants are located in a different building, city, state, country, etc. Likewise, each of the client devices (items 206, 210, 214, and 217) has the capability of running a control application (items 208, 212, and 216), which, in some embodiments, is accessed by the client devices (items 206, 210, 214, and 217) by way of a web page. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of computing devices 202, client devices (items 206, 210, 214, and 217), and remote control services 220.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The computing device 202 may include any type of computing device, such as the computing device 100 described with reference to FIG. 1, for example. Generally, the computing device 202 includes a browser and a display. The browser, among other things, is configured to provide for a screen-sharing application to be used to allow participants associated with the client devices (items 206, 210, 214, and 217) to view the shared application. Examples of screen-sharing applications include Lync® video conferencing and SharePoint® collaboration software, as well as others not specifically mentioned herein. Lync® and SharePoint® are registered trademarks of Microsoft Corporation in the United States and/or other countries. The browser further is configured to receive commands from client devices (items 206, 210, 214, and 217) through the remote control service 220 via the network 218. It should be noted that the functionality described herein as being performed by the browser may be performed by any other application, application software, user interface, or the like capable of rendering Web content. It should further be noted that embodiments of the present invention are equally applicable to mobile computing devices and devices accepting gesture, touch and/or voice input. Any and all such variations, and any combination thereof, are contemplated to be within the scope of embodiments of the present invention.

The display of the computing device 202 may include a display device that is coupled to the computing device 202, but in embodiments herein, a supplemental display device may be connected (wired or wireless) to the computing device 202 to allow a larger presentation of the shared application to be displayed to the participants in the room. In these embodiments, a projector may also be utilized or provide the larger presentation of the shared application. Participants who are located remotely from the computing device 202 that is running the shared application, as previously mentioned, are able to view a presentation of the shared application by way of a screen-sharing application, which may be any application that allows for a remotely-located user to view the content on another display device, typically by way of the Internet.

A shared application, as used herein, may refer to any application, document, game, enterprise software, other software running on a device, information protocol, a presentation, a web page, a video, music, other multimedia, or the like. The shared application may be any of the above, and may further be interactive, navigable, actionable, or human-interactive. In one embodiment, the shared application is capable of being shared with other participants, which may include being shared with participants in the same room (e.g., via a projector on a large display device) or being shared with participants remotely located from the computing device running the shared application (e.g., via a screen-sharing application).

As used herein, sensitive information is information that identifies the shared application 204 or the computing device 202 running the shared application 204. As mentioned, one or more of a non-human readable identifier, a human-readable name, and a unique identifier (e.g., PIN number) are assigned to the shared application by the remote control service 220 (e.g., attribute assignment component 224) upon the remote control service 220 (e.g., the request-receiving component 222) receiving a request from the shared application 204 for client devices to participate in a remote control of the shared application 204. The non-human readable identifier, the human-readable name, and the unique identifier will be referred to herein as attributes. The attributes, in one embodiment, are the only information the client device (items 206, 210, 214, and 217) has been given regarding the shared application 204 or the computing device 202, or even the network within which the computing device 202 operates. As such, a business associated with the computing device 202 would not have to worry about sensitive or secure information being communicated outside of the secured network. While previously, when a first device would have the capability to control a second device, the first device would need to know identifying information about the second device, such as the device's Internet Protocol (IP) address, location information, document information, etc., for the first device to have control over the second device. Here, this type of sensitive and secure information is not required for the client device (items 206,

210, 214, and 217) to participate in control over the shared application 204 running on the computing device 202. As such, in one embodiment, sensitive information is any information associated with the shared application 204 or the computing device 202 running the shared application 204 other than or excluding the assigned attributes. The information that each client device (items 206, 210, 214, and 217) may have regarding the shared application 204 or the computing device 202 running the shared application 204, in this embodiment, does not include any information that would allow a third party, such as a client device, to identify the computing device 202 or the shared application 204, which could potentially include secured or sensitive information relating to a business, for example.

As mentioned above, the client devices (items 206, 210, 214, and 217) may be any type of device that enables a user of the client device to input commands when participating in a control of the shared application. In one embodiment, the client device (items 206, 210, and 214) has an associated display device that allows the user to view the shared application and also to view the control application, allowing the user to input controls when participating in control of the shared application. In an alternate embodiment, the client device (item 217) does not have an associated display device, but is more of a controller that allows the user to input commands, but not to view the shared presentation on the device. This may be the case when the participants of a presentation are in the same room as the presenter, and thus the participants are able to view the presentation on a projection screen, for example. Or regardless whether the participants are in the same room, the client device (item 217) may be a second device utilized by that particular viewer of the presentation. As such, the participant may have a first device that is similar to client device 217 without display capabilities, but may also have a second device that is similar to client devices 206, 210, or 214 with display capabilities. The first device, such as client device 217, may not require display capabilities if a separate device is utilized by that viewer.

Each of the client devices (items 206, 210, 214, and 217) may include an application, such as applications 208, 210, and 216. In one embodiment, this application is the control application that allows the client device to communicate commands to the remote control service 220. The application 208, 210, and 216 may be available by way of a web page that the user visits to interact with the application. The commands that are made by the user, in one embodiment, include only those commands that do not modify content of the shared application. For exemplary purposes only, these commands may include scrolling up in the shared application, scrolling down in the shared application, going backward in the shared application (e.g., moving to a previous slide), going forward in the shared application (e.g., moving to the next slide), returning to the first slide of a presentation or to the top of the page/document, or the like. None of these actions modify content of the shared application.

However, in an alternate embodiment, the commands communicated by the client devices do allow a user of a client device to modify content of the shared application, such as making edits, deleting or adding alphanumeric or other characters, or any other modifications that would alter the content of the shared application. For instance, if the shared application is a document used to present slides, a user of a client application may suggest adding a bullet point to one of the slides, and may actually make that edit to the shared application from a remote location. In one instance, the edits made by a client device are actually made to the application and are saved, but in another instance, the edits made by a client device are only shown as a preview, and are not actually saved. There are many exemplary embodiments where a remote user, or even a user in a room viewing the shared application, may wish to make content modifications to the shared application. If there is a collaborative effort to put a document together, for instance, allowing all participants to make modifications would be beneficial. Even in the embodiments where content modifications are allowed, the client devices may not receive any sensitive information regarding the shared application or the computing device that is running the shared application. In these embodiments where content modifications are allowed, the commands to make a modification may go through the remote control service 220 such that sensitive information is not communicated to the client device.

The remote control service 220 includes various components, including a request-receiving component 222, an attribute assignment component 224, a command-receiving component 226, and a command-routing component 228. Other components not shown in FIG. 2 or listed herein are also contemplated to be within the scope of the present invention, and may be utilized within the remote control service 220. The request-receiving component 222 is generally responsible for receiving and processing requests from a shared application that wants client devices to participate in the remote control of the requesting shared application. In one instance, the request comes from a shared application 204, but in another instance, the request comes from the computing device 202 running the shared application 204. In yet another instance, the request comes from a third-party device or application.

Once the request has been received and processed, the attribute assignment component 224 assigns and communicates one or more attributes to the shared application. For instance, these attributes may include a non-human readable identifier, a human-readable identifier or name, and a numerical identifier, such as a PIN number. The non-human readable identifier is used when commands are sent back and forth from the client devices (items 206, 210, 214, and 217), to the remote control service 220, and to the shared application 204. This identifier may be temporarily assigned, and is used by the machines so that the remote control service 220 knows which shared application to send a command to, as the client devices (items 206, 210, 214, and 217) do not have any sensitive information associated with the shared application 204 or the computing device 202 running the shared application 204.

The human-readable identifier may be a name (e.g., arbitrary or unique name) that is temporarily assigned to the shared application and that allows participants of the shared application to be able to remotely control the shared application. In one embodiment, once the attribute assignment component 224 assigns a name to the shared application 204, the shared application 204 causes the name to be displayed on a display device, which, in some embodiments, is a display device separate and distinct from a display device associated with the computing device 202 (e.g., projector screen), or may be the display device associated with the computing device 202, but may be viewed by way of a screen-sharing application, for example. The participants who are participating on a session associated with the shared application 204, which may be a remotely controlled session, can see the assigned name and may use that to gain control of the shared application 204. For remote participants, the name may be visible via a screen-sharing application, then open the control application, which may be a web page in one embodiment, and enter the name into an input mechanism, which allows the client device (items 206, 210, 214, and 217) control of the shared application 204. In one embodiment, a numeric identifier is also temporarily assigned to the shared application 204. In one instance, this is a PIN number that adds an extra layer of security to ensure that the client devices obtaining control over the shared application are doing so with permission. This numeric identifier is also accessible to the participants regardless of whether the participants are located in the same room as the computing device 202 or whether they are remotely located from the computing device 202.

The command-receiving component 226 generally receives commands from the client devices (items 206, 210, 214, and 217) and determines which shared application the commands are to be routed. For instance, the remote control service 220 may be maintaining multiple shared applications simultaneously, so the command-receiving component would need to know to which shared application to send the command. This determination may be made on the non-human readable identifier sent along with the command from the client devices (items 206, 210, 214, and 217), which uniquely identifies the shared application 204. As mentioned, the commands enable the client devices (items 206, 210, 214, and 217) to modify a display of the shared application 204 without the one or more client devices (items 206, 210, 214, and 217) having sensitive information associated with the shared application 204 or the computing device 202 running the shared application 204.

The command-routing component 228, once the command has been received, routes the command to the appropriate shared application. As such, the command-routing component 228 causes, by way of the command, a modification to the display of the shared application. While embodiments described herein refer to the one or more attributes being assigned to the shared application, in other applications, the attributes may actually be assigned to the remotely controlled session associated with the shared application.

As shown in FIG. 2, a data store 230 is coupled to the remote control service 220. This data store 230 may store the attribute information described above, and the association of the attributes with the remotely controlled session or the shared applications. This information can then be retrieved and used by, for example, the command-receiving component 226 or the command-routing component 228 to determine how to route the commands (e.g., which shared application to send the commands).

Figure 3:
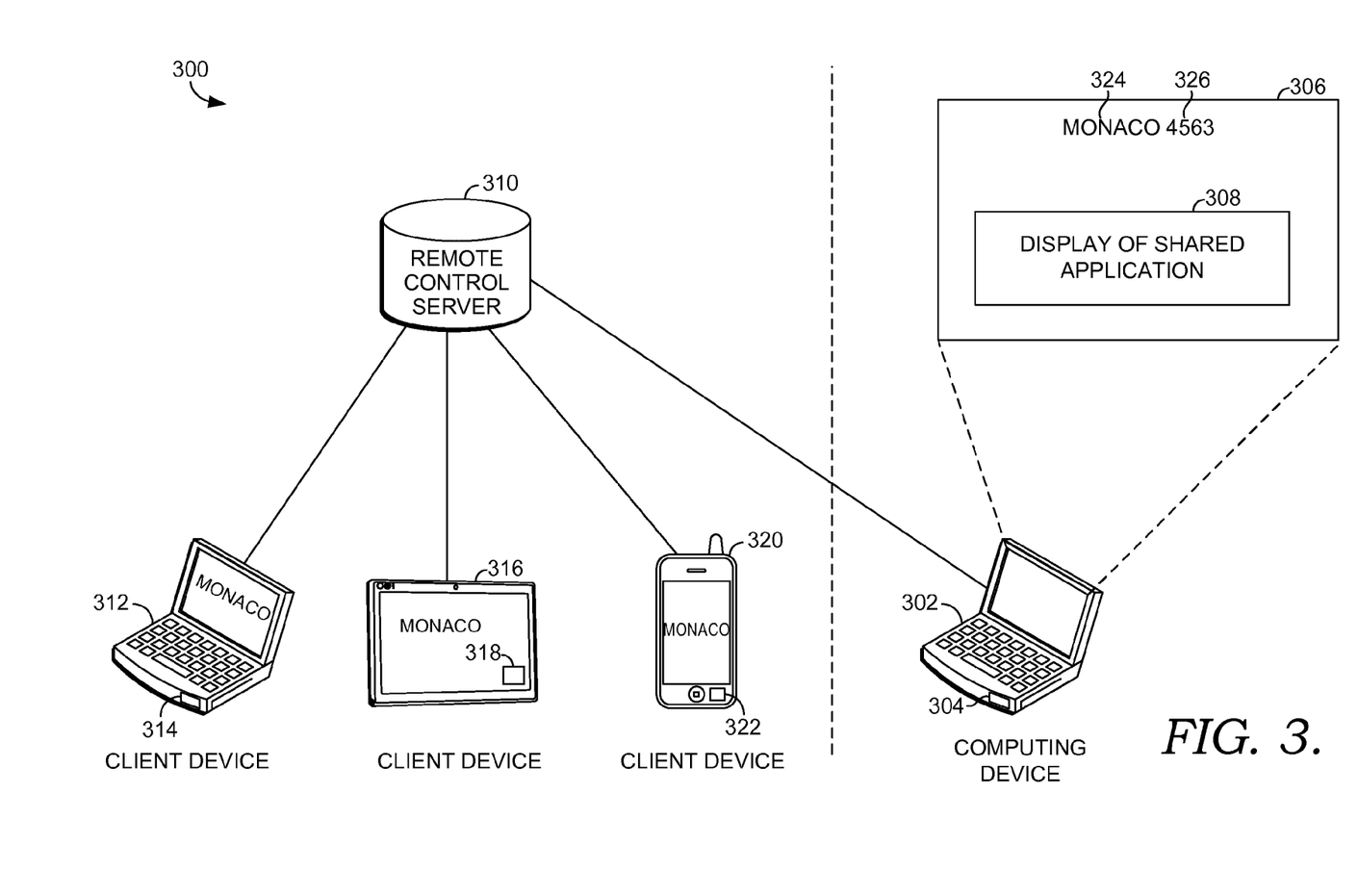
FIG. 3 is a diagram of exemplary components employed in a remote control of a shared application, in accordance with an embodiment of the present invention.

Turning now to FIG. 3, a diagram is shown of exemplary components employed in a remote control of a shared application, in accordance with an embodiment of the present invention. The system of FIG. 3 is generally referred to herein as system 300. System 300 includes, on the application side, a computing device 302 and a shared application 304 running on the computing device 302. The shared application 304 may be viewable to participants in the same room by way of enlarged display 306, or to participants located remotely to the computing device 302 by way of a screen-sharing application. The enlarged display 306 includes a display presentation of the shared application 308, and various attributes (items 324 and 326) associated with the shared application 304 or a remotely controlled session associated with the shared application 304. Again, the display of the attributes (items 324 and 326) allows participants to enter these attributes into the control application (e.g., via a web page) on the client device (items 312, 316, and 320) to be able to participate in the control of the shared application 304. The enlarged display 306 may not be used when all participants are located remotely from the computing device 302, as a screen-sharing application is used in that case. In some cases, the enlarged display 306 and a screen-sharing application are both used when participants are located in the same room and remotely from the computing device 302.

On the server side, the remote control server 310 may be capable of communicating with the shared application 304 by way of the computing device 302 and the client devices (items 312, 316, and 320). As shown, "MONACO" is one of the attributes 324 displayed on the enlarged display 306. In one embodiment, a user of a client device 312 views the name "MONACO" 324 either by way of the enlarged display 306 or a screen-sharing application and when the control application is opened on the client device 312, the name "MONACO" appears on the participant's display associated with the client device 312. The participant may then select "MONACO" to join the group of other client devices that are able to control the shared application 304. In one embodiment, the participant must also enter the numeric identifier 326 to participate in control of the shared application 304. The remote control server 310, in one embodiment, performs the same functions as described in FIG. 2 with reference to the remote control service 220.

Figure 4:
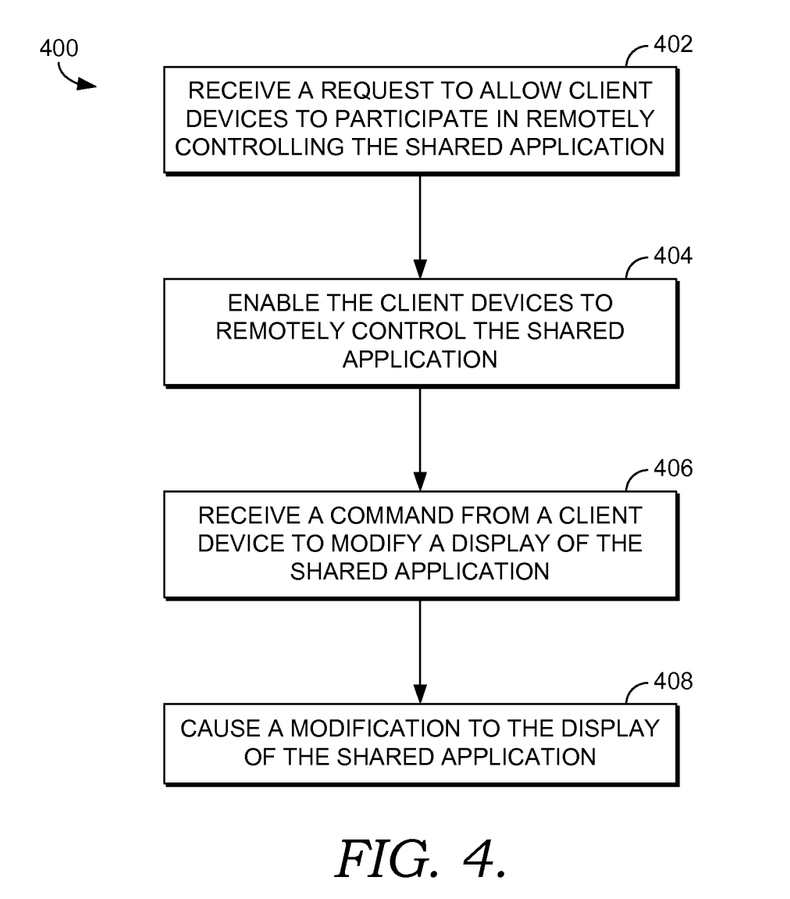
FIG. 4 is a flow diagram showing an exemplary method for enabling one or more client devices to remotely control a shared application, in accordance with an embodiment of the present invention.

Turning now to FIG. 4, a flow diagram is illustrated showing an exemplary method 400 for enabling one or more client devices to remotely control a shared application, in accordance with an embodiment of the present invention. Initially at step 402, a request is received that allows client devices to participate in remotely controlling the shared application. In one embodiment, this request is received from the shared application, but in another embodiment, the request is from the computing device running the shared application. In yet another embodiment, the request is from a third party computing device or application. At step 402, the client devices are enabled to remotely control the shared application. In one embodiment, this step comprises assigning one or more attributes to a remotely controlled session associated with the shared application, and communicating the attributes to the shared application. The attributes enable the client devices to control the shared application by way of a control application. For instance, in one embodiment, one or more attributes are inputted by a participant into the control application. In one embodiment, the control application is a web page.

At step 406, a command is received from a client device to modify a display of the shared application. In one embodiment, this is done without the client device having received sensitive information associated with the shared application or a computing device running the shared application. Again, sensitive information may refer to any information that the user or business associated with the shared application or the computing device running the shared application does not want others to have to know about. In one instance, sensitive information is information that identifies the shared application. For instance, the sensitive information may be identifying information associated with the shared application other than the one or more attributes temporarily assigned to the shared application or to the remotely controlled session associated with the shared application. The attributes may include a non-human readable identifier, a human-readable identifier or name, and a numeric identifier (e.g., a PIN number). The display of the shared application may be a presentation view of the shared application, such as a view of the content of the shared application on a display device, such as an enlarged display device. The modification of the display may cause a modification in what is being presented on the display device that is displaying the shared application. In one embodiment, the modification is not a modification to the content of the shared application.

At step 408, the command is utilized to cause a modification to the display of the shared application. Here, the command may be provided to the shared application. In one embodiment, the command may allow for a user of a client device to modify the shared application by moving forward, moving backward, scrolling up, or scrolling down in the shared application. Additionally, user may be able to return to the beginning of the shared application. In one embodiment, the command does not allow the user to make modifications to the content of the shared application. In one embodiment, the shared application is a document, a game, enterprise software, other software, a presentation, a web page, a video, music, or other multimedia. Other things not specifically named herein may also be considered to be a shared application, and are contemplated to be within the scope of the present invention.

Figure 5:
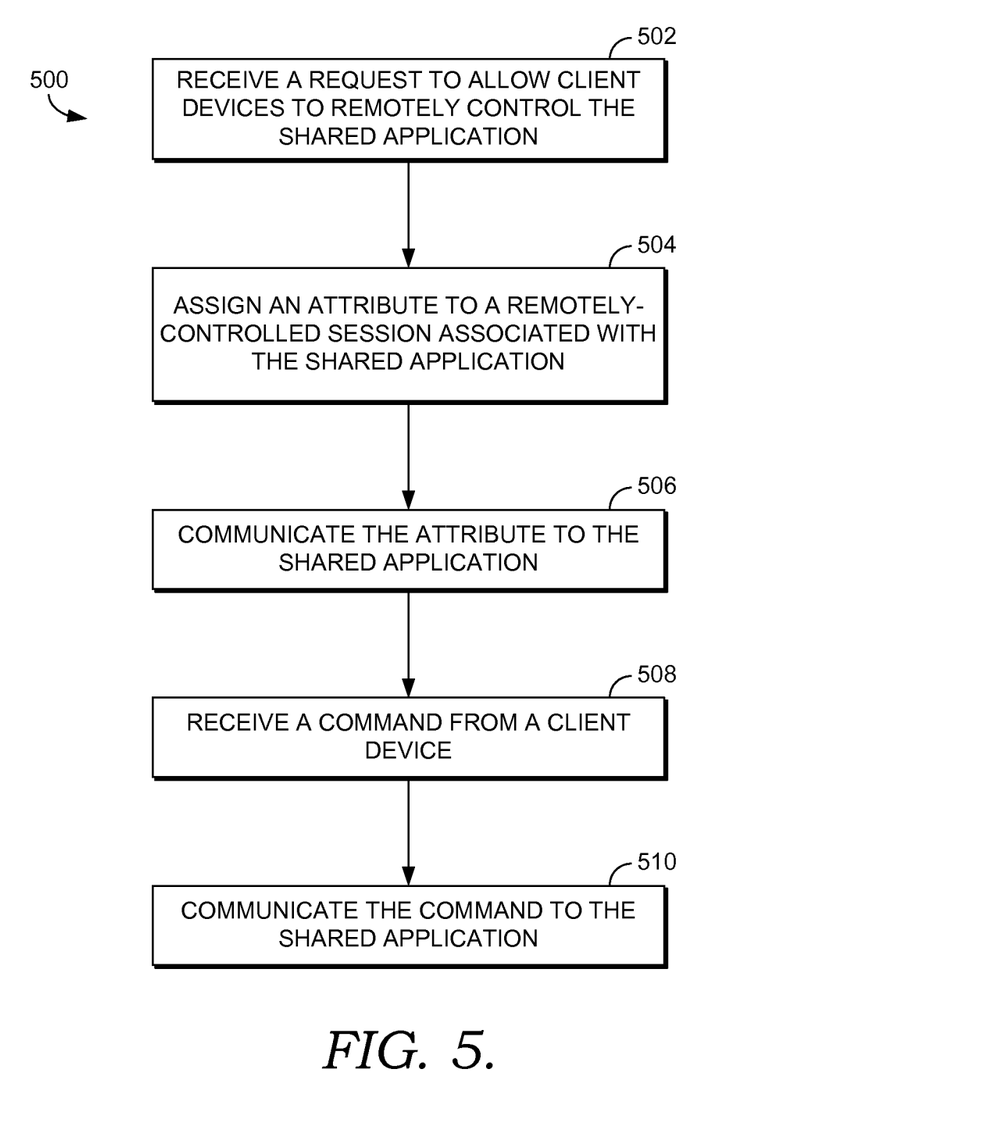
FIG. 5 is a flow diagram showing an exemplary method for enabling one or more client devices to remotely control a shared application, in accordance with an embodiment of the present invention.

Referring to FIG. 5, a flow diagram is shown of an exemplary method 500 for enabling one or more client devices to remotely control a shared application, in accordance with an embodiment of the present invention. Initially at step 502, a request is received, such as from the shared application, to allow client devices to remotely control the shared application. In one embodiment, at least a portion of the client devices participating in the control of the shared application are located remotely from a computing device running the shared application. These client devices may view the shared application by way of a screen-sharing application. One or more attributes are assigned to a remotely controlled session associated with the shared application at step 504. As mentioned, the attributes may be one or more of a non-human readable identifier, a human readable identifier (e.g., name to associate with the shared application), or a numeric identifier (e.g., PIN number). At step 506, the assigned attributes are communicated to the shared application. The attributes enable the client devices to access a control application having controls corresponding to the shared application. In one embodiment, the control application is accessed by the client devices via a web page. In one aspect, the attribute is a unique numeric string of characters, such as a PIN number, that is assigned to a remotely controlled session associated with the shared application. This unique numeric string may also be communicated to the shared application, such that when a participant is viewing the a presentation of the shared application through a screen sharing application or on an enlarged device in a conference room, for instance, the participant can use the numeric string to participate in control of the shared application.

At step 508, a command is received from one of the client devices participating in the control of the shared application. The command enables the client device to modify a display of the shared application without the client device having sensitive information associated with the shared application or a computing device running the shared application. In one embodiment, the display of the shared application corresponds to a current view of the shared application on a display device associated with the computing device running the shared application, or the current view of the shared application as viewed by each participant. The command, in one embodiment, allows a participant to control the display or presentation of the shared application without making any modifications to content of the shared application. At step 510, the command is communicated to the shared application.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method being performed by one or more computing devices having at least one processor, the method for enabling one or more client devices to remotely control a shared application, the method comprising:
   receiving a request to allow the one or more client devices to participate in remotely controlling the shared application;
   assigning one or more attributes to a remotely controlled session associated with the shared application, the one or more attributes comprising at least one of a non-human readable identifier, a human-readable identifier, and a numeric identifier;
   based on the request, enabling the one or more client devices to remotely control the shared application;
   receiving a command from one of the one or more client devices to modify a display of the shared application without the one of the one or more client devices having received secure information associated with the shared application, wherein the command from the one or more client devices comprises the one or more attributes assigned to the remotely controlled session; and
   utilizing the command and the one or more attributes to cause a modification to the display of the shared application.

2. The method of claim 1, wherein enabling the one or more client devices to remotely control the shared application further comprises:
   communicating the one or more attributes to the shared application, the one or more attributes enabling the one or more client devices to control the shared application by way of a control application.

3. The method of claim 2, wherein the control application is a web page.

4. The method of claim 1, further comprising providing the command from the one of the one or more client devices to the shared application.

5. The method of claim 1, wherein the request is received from the shared application.

6. The method of claim 1, wherein the display of the shared application is a presentation view of the shared application.

7. The method of claim 1, wherein the modification of the display causes the modification in what is being presented on a display device that is displaying the shared application.

8. The method of claim 1, wherein the secure information is information that identifies the shared application.

9. The method of claim 1, wherein the secure information is identifying information associated with the shared application other than one or more attributes assigned to the shared application.

10. The method of claim 1, wherein the command allows for a user of the one of the one or more client devices to modify the shared application by moving forward, moving backward, scrolling up, or scrolling down in the shared application.

11. The method of claim 1, wherein the command allows for a user of the one of the one or more client devices to modify the display of the shared application without making any modifications to content of the shared application.

12. The method of claim 1, wherein the shared application is one or more of a document, a game, enterprise software, a presentation, a web page, or a video.

13. One or more computer storage hardware devices storing computer-useable instructions that, when used by one or more computing devices, cause the one or more computing devices to perform a method for enabling one or more client devices to remotely control a shared application, the method comprising:
  receiving a request from the shared application to allow the one or more client devices to remotely control the shared application, at least a portion of the one or more client devices located remotely from a computing device running the shared application and the one or more client devices viewing a presentation of the shared application using a screen-sharing application;
  assigning one or more attributes to a remotely controlled session associated with the shared application, the one or more attributes comprising a non-human readable identifier, a human-readable identifier, and a numeric identifier;
  communicating the one or more attributes to the shared application, the one or more attributes enabling the one or more client devices to access a control application having controls corresponding to the shared application;
  receiving a command from one of the one or more client devices, the command enabling the one of the one or more client devices to modify a display of the shared application without the one of the one or more client devices having secure information associated with the shared application, and the command comprising the one or more attributes assigned to the remotely controlled session; and
  communicating the command from the one of the one or more client devices to the shared application.

14. The one or more computer storage hardware devices of claim 13, wherein the control application is accessed by the one or more client devices via a web page.

15. The one or more computer storage hardware devices of claim 13, wherein the display of the shared application corresponds to a current view of the shared application on a display device associated with the computing device running the shared application.

16. The one or more computer storage hardware devices of claim 13, wherein the secure information is identifying information associated with the shared application other than the one or more attributes and other information that is assigned to the shared application for running the remotely controlled session.

17. The one or more computer storage hardware devices of claim 13, further comprising
  assigning a unique numeric string to the remotely controlled session associated with the shared application; and
  communicating the unique numeric string to the shared application, the unique numeric string enabling the one or more client devices to access a control application having controls corresponding to the shared application.

18. The one or more computer storage hardware devices of claim 13, wherein the command allows for a user of the one of the one or more client devices to modify the display of the shared application without making any modifications to content of the shared application.

19. The one or more computer storage hardware devices of claim 17, wherein the secure information is identifying information associated with the shared application other than a non-human readable identifier assigned to the shared application, the human-readable identifier assigned to the shared application, and the unique numeric string assigned to the shared application.

20. A system for enabling one or more client devices to remotely control a shared application, the system comprising:
  a remote control service, the remote control service comprising:
    a processor; and
    one or more computer storage hardware devices storing computer useable instructions that when executed by the processor cause the processor to:
    receive a request from the shared application to allow the one or more client devices to participate in a remote control of the shared application,
    assign one or more attributes to a remotely controlled session associated with the shared application and that communicates the one or more attributes to the shared application, the one or more attributes enabling the one or more client devices to access a control application having controls corresponding to the shared application, where the one or more attributes comprising a non-human readable identifier, a human-readable identifier, and a numeric identifier,
    receive commands commands from the one or more client devices, the commands enabling the one or more client devices to modify a display of the shared application without the one or more client devices having received secure information associated with the shared application, and the commands comprising the one or more attributes assigned to the remotely controlled session, and
  communicate the commands from the one or more client devices to the shared application, thus causing a modification of the display of the shared application.

* * * * *